3,779,955
NON-BURNING RESINOUS COMPOUNDS AND STRUCTURES PREPARED FROM FURAN RESINS
Robert C. Wade, Ipswich, Mass., assignor to Resitron Corporation, Beverly, Mass.
No Drawing. Continuation of abandoned application Ser. No. 174,999, Aug. 25, 1971. This application Jan. 31, 1972, Ser. No. 222,332
Int. Cl. C08g 11/00, 41/04
U.S. Cl. 260—2.5 F    4 Claims

ABSTRACT OF THE DISCLOSURE

Non-burning resinous compositions which are useful in bulk, as foams, as coatings, or as adhesives are provided by reacting aqueous phosphoric acid with non-reducing polyhydric compounds, such as ethylene glycol, propylene glycol, glycerine, and polyvinyl alcohol, and then reacting the complex thus formed with a furfuryl alcohol-containing compound, such as furfuryl alcohol or furfuryl alcohol-urea-formaldehyde condensates. Not less than about 3 percent of phosphorus is required in the final composition to give the desired non-burning characteristics. These compositions are hydrophobic and maintain their structural integrity after water immersion. Preferably, these compositions contain a ratio of furan resin to phosphoric acid-polyhydric compound complex of greater than 1 to 1. The reaction mixture may contain a pneumatogen and surfactant.

---

This application is a continuation of my copending application Ser. No. 174,999, filed Aug. 25, 1971 and now abandoned.

It has long been known that mineral acids such as phosphoric acid will cause furfuryl alcohol to polymerize vigorously into highly crosslinked, brittle, thermoset resinous masses. This phenomenon has been used where furfuryl alcohol or furfuryl alcohol reacted with formaldehyde and urea are mixed with foundry sands and polymerized to bind the sand into a mold for metal castings. However, the bulk polymerization of furfuryl alcohol with mineral acids has not been practiced because of the uncontrollable violence of the reactions involved and the irregular porous and brittle nature of the resin. It would be highly desirable to be able to polymerize furfuryl alcohol and modifications of this material with substantial amounts of phosphoric acid in a controlled manner since such products should provide nonflammable structures of wide utility.

One recent attempt in this direction is disclosed in U.S. Pat. 3,551,365, issued Dec. 29, 1970 which describes the reaction products of a reducing sugar, phosphoric acid, water, and a polyhydric phenol such as resorcinol over a wide range of compositions, which are referred to as "resin formers." These "resin formers" are reacted with furfuryl alcohol and furfuryl alcohol-urea-formaldehyde condensates to provide thermosetting resins which cure at room temperature or at elevated temperature to provide heat resistant, fire resistant compositions with a fairly wide range of physical properties. It is specified that these thermosetting compositions be prepared with not more than one part by weight of the hardener (furfuryl alcohol) to one part by weight of the "resin former." In practice, it has been found that these compositions have one serious disadvantage in commercial applications which involve exposure to water. They are hydrophilic and have a very high moisture absorption (>300% by weight) and quickly lose their structural integrity when immersed in water.

I have now discovered compositions containing phosphoric acid and furfuryl alcohol which polymerize in a controlled manner to give structures of high fire resistant, very low smoke emission in a flame, excellent wet and dry strength, low water absorption, and excellent adhesion to many substrates. These compositions may be used in bulk, they may be foamed to low densities, they may be used as non-burning adhesives, or protective coatings.

The present invention is based upon the discovery that aqueous phosphoric acid, preferably about 85% phosphoric acid, can be reacted, at least in part, with non-reducing aliphatic polyhydric compounds to form a complex which in turn will react in a very controlled manner with a furfuryl alcohol containing compound, such as furfuryl alcohol or condensates of furfuryl alcohol-urea-formaldehyde containing at least 35 percent by weight of furfuryl alcohol. A non-reducing polyhydric compound is defined in this invention as a polyhydric compound which contains no aldehydic group capable of reducing Fehlings solution. If a foamed product is desired, a pneumatogen, such as a metal powder which will react to release hydrogen, and a surfactant may be added to the reaction mixture. It is preferred to employ a ratio of furfuryl alcohol or furan resin to phosphoric acid-polyhydric compound of greater than 1 to 1. To obtain the desired fire and flame resistance it is necessary for the final resinous composition to contain about 3 percent phosphorus by weight.

As illustrative of non-reducing aliphatic polyhydric compounds I may mention ethylene glycol, propylene glycol, glycerine, pentaerythritol, trimethylpropane, sorbitol, and the ethoxylated and propoxylated derivatives thereof, and polyvinyl alcohol.

The invention is illustrated further by the following specific examples.

EXAMPLE 1

A 20% aqueous solution of a low viscosity polyvinyl alcohol (Elvanol 70–05) was prepared by standard techniques. Fifty ml. of this solution was mixed with 10 ml. of 85% phosphoric acid. Twenty ml. of a furfuryl alcohol - urea - formaldehyde condensate containing about 62% furfuryl alcohol was added to this mixture with good agitation to give a yellow emulsion; a slowly exothermic reaction took place, the reaction mixture increasing in viscosity to first form a deformable gel, then a rubbery mass. This rubbery mass could easily be coated on wood and paper and placed in an oven to remove the water. The coating turned to a shiny black color and was an excellent adhesive for wood and paper. It was completely non-flammable and protected the substrate from burning in a direct flame.

A piece of the rubbery material was baked in a hot oven until the water was removed. There resulted an extremely tough, non-water soluble, hydrophobic non-combustible foam structure that had very low smoke emission when exposed to direct flame.

EXAMPLE 2

Fifty g. of the 20% polyvinyl alcohol solution of the previous example was mixed with 10 g. of 85% phosphoric acid. Then 20 g. of furfuryl alcohol was mixed into solution. There resulted a yellow solution-emulsion which very slowly increased in viscosity on standing at room temperature. Various cellulosic substrates were coated with this composition and dried to remove water. The coatings which resulted were an attractive dull black color and were completely non-flammable and provided excellent fire protection to the substrate. Almost no smoke resulted from this material when directly exposed to a flame. Furthermore, the material is an excellent, fairly flexible adhesive for glass, paper, wood and leather.

EXAMPLE 3

Mixed 20 grams of 85% phosphoric acid with 30 grams of propylene glycol. Heat was evolved. Heated this mixture to 150° C. over a period of 10 minutes. Cooled to room temperature. Added 10 grams of this reaction product with 20 grams of furfuryl alcohol. This mixture cured slowly to give a thermoplastic non-burning black solid which is useful in non-burning hot melt adhesives and caulks.

EXAMPLE 4

Mixed and heated 13.6 grams pentaerythritol and 5.8 grams of 85% $H_3PO_4$ to 150° C. then cooled to room temperature. Mixture was quite viscous. Added 20 grams furfuryl alcohol to this mixture. On vigorous mixing a slow reaction occurred with the temperature gradually rising to over 100° C. A black solid polymer resulted which did not burn. It became rubbery but not thermoplastic when heated. It was completely water resistant.

EXAMPLE 5

5 grams of a low viscosity polyvinyl alcohol (Du Pont Elvanol® 70–05) was mixed with 45 grams of 85% phosphoric acid. Upon warming to 60–70° C. with stirring all of the polyvinyl alcohol dissolved to give a clear viscous solution. I call this catalyst D.

20 grams of a furfuryl alcohol polymer containing about 62% furfuryl alcohol and 10 grams of catalyst D as prepared and 0.2 gram of aluminum powder were mixed. A very fast but controlled reaction occurred wherein the mixture foamed and gelled then cured to a hard non-burning, water repellent foamed structure.

EXAMPLE 6

20 grams of catalyst D described in Example 5 was mixed with 10 grams of glycerine. This mixture is called catalyst E.

EXAMPLE 7

Mixed 75 grams of a polymer consisting of about 62% furfuryl alcohol, the balance urea, formaldehyde and water, with 15 grams of catalyst E and about 1 gram aluminum powder. This mixture blended well together and started to react slowly, but then with considerable exotherm to give a good uniform dark orange rigid foam which did not burn and was completely water resistant.

EXAMPLE 8

20 grams of a commercial triol—Wyandotte Chemical Co. "Pluracol TP 440" which is the reaction product of propylene oxide and trimethylolpropane of an average molecular weight equal to 440 was mixed with 20 grams of 85% phosphoric acid. Heat was evolved and when cooled, the viscosity of this solution had increased markedly when compared to the starting materials. This was called catalyst G–5050.

EXAMPLE 9

A commercially available furfuryl alcohol based resin, Werner G. Smith "Hot Box 1500" which contains about 36% furfuryl alcohol, 34% ureaformaldehyde and 30% water was used in the following experiment. 20 grams of this resin was mixed with 7 grams of catalyst G–5050, 0.1 gram aluminum powder and 1 gram of Du Pont "Freon-113," a fluorinated hydrocarbon blowing agent. After 1 minute delay, the mixture foamed and cured to form a very hard, tough fine celled foam of about 15 lb./cu. ft. density that was non-burning, of 88% smoke density and with excellent water resistance. The coke strength of a "burned" sample was very good.

EXAMPLE 10

A commercially available furfuryl alcohol based resin which was obtained from Schenectady Chemicals, Inc. called "FRJ 466" which was about 62% furfuryl alcohol polymer diluted with about 38% furfuryl alcohol monomer and which had a viscosity of 8000 centipoises was used in this experiment. 20 grams of this resin was mixed with 0.5 gram of a silicone surfactant from Union Carbide Corporation L5420 and 2 grams of "Freon-113" fluorocarbon blowing agent. To this was added 5 grams of catalyst G of Example 8. This mixture was placed in a hot air oven to initiate the foam-cure reaction. After about 5 minutes the mixture foamed and cured to a rigid foam of about 6 lb./cu. ft. density with a fine cell structure. The foam was self-extinguishing, had a low smoke density and was completely water resistant.

I claim:

1. A resinous composition comprising the polymerization product of (1) a complex of phosphoric acid and a non-reducing aliphatic polyhydric compound, and (2) a compound containing furfuryl alcohol selected from the group consisting of furfuryl alcohol and the condensate of furfuryl alcohol, urea and formaldehyde, said furfuryl alcohol containing compound containing at least 35 percent by weight of furfuryl alcohol, said composition containing at least about 3 percent by weight of phosphorus.

2. The composition as claimed by claim 1 wherein the non-reducing aliphatic polyhydric compound is selected from the group consisting of ethylene glycol, propylene glycol, glycerine, pentaerythritol, trimethylpropane, sorbitol, mixtures thereof and the ethoxylated and propoxylated derivatives thereof, and polyvinyl alcohol.

3. The composition as claimed by claim 1 wherein the composition contains a pneumatogen.

4. The composition as claimed by claim 2 wherein the composition contains a pneumatogen.

References Cited
UNITED STATES PATENTS

| | | | |
|---|---|---|---|
| 3,551,365 | 12/1970 | Matalon | 260—17.2 |
| 3,501,429 | 3/1970 | Bonzagni | 260—17.3 |
| 3,247,556 | 4/1966 | Buell et al. | 260—70 A |

HAROLD D. ANDERSON, Primary Examiner

E. WOODBERRY, Assistant Examiner

U.S. Cl. X.R.

260—17.3, 69, 70